Dec. 10, 1929.   J. L. CHESNUTT   1,739,290
POULTRY DRINKING FOUNTAIN
Filed Feb. 13, 1928   2 Sheets-Sheet 2

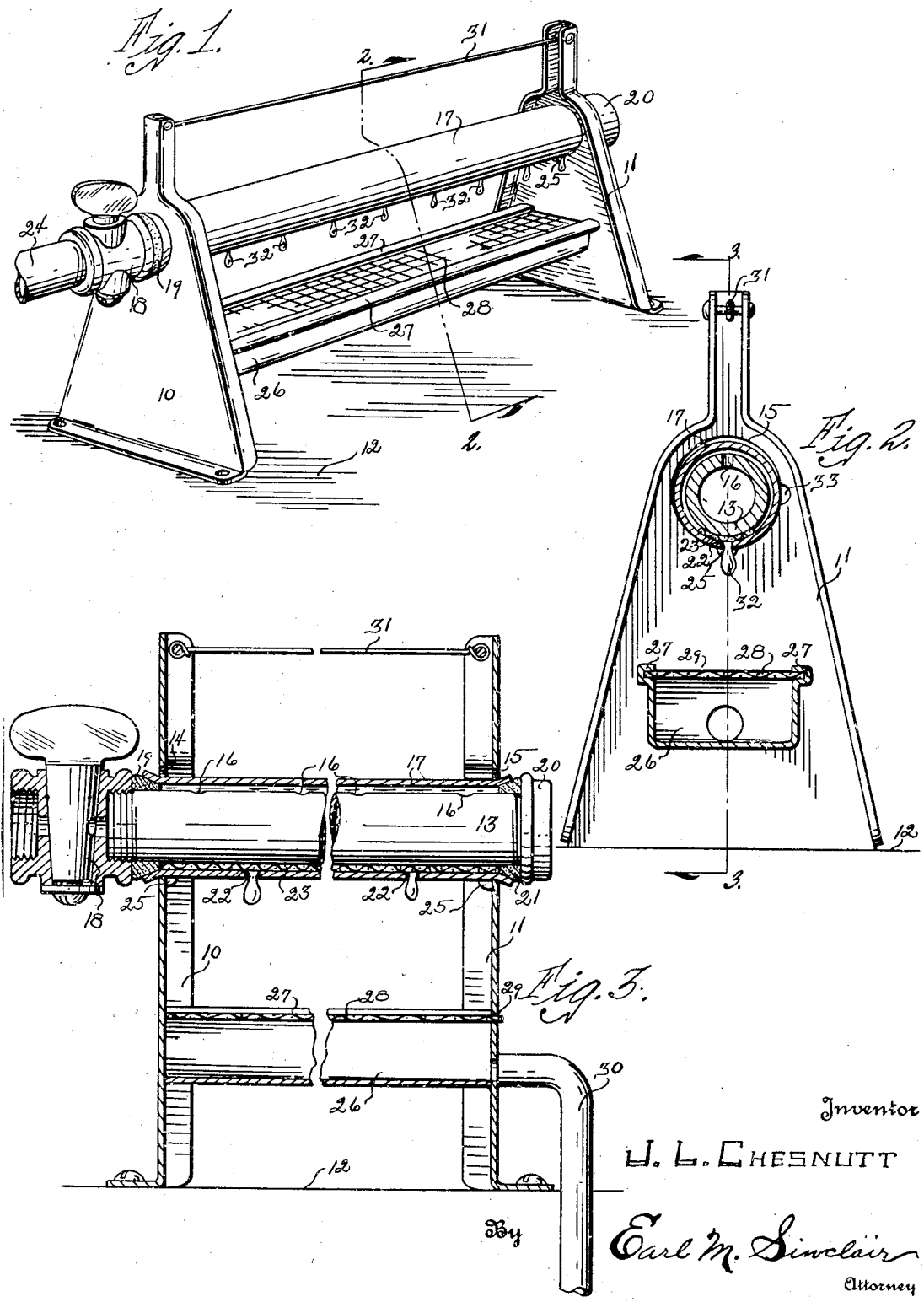

Inventor
J. L. CHESNUTT
By Earl M. Sinclair
Attorney

Patented Dec. 10, 1929

1,739,290

UNITED STATES PATENT OFFICE

JOHN LOUCIEN CHESNUTT, OF LONG BEACH, CALIFORNIA

POULTRY DRINKING FOUNTAIN

Application filed February 13, 1928. Serial No. 253,869.

The principal object of this invention is to provide a sanitary drinking fountain for chickens and the like.

A still further object of this invention is to provide a device for supplying fresh water to each individual fowl, thereby eliminating the possibility of spreading a disease among the flock, as is the case with the ordinary water trough.

A still further object of this invention is to encourage the drinking of more water by the chickens.

A still further object of this invention is to provide a drinking fountain for fowls and the like that does not permit the contaminating of the water by the polluted beaks of the chickens, wading in the drinking water, or otherwise making the water unclean by the chickens themselves.

A still further object of this invention is to provide a device for supplying water to chickens that cannot be used as a perch by the fowls.

A still further object is to provide a drinking fountain for chickens that economically supplies clean water and can be easily adjusted relative to the amount of water used.

A still further object is to provide a device for supplying water to chickens that is self-cleaning and requires no further attention after having once been installed.

A still further object of this invention is to provide a device for supplying water to chickens that is economical in manufacture and durable in use.

Still another object is to provide a sanitary poultry fountain in which means is provided for normally shutting off or practically shutting off the supply of water at all times when the fowls are not in position for taking water therefrom, thus saving an undue waste of drinking water.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a perspective view of my invention installed and in use.

Fig. 2 is an end sectional view taken on line 2—2 of Fig. 1.

Fig. 3 is a side sectional view of my complete device taken on line 3—3 of Fig. 2, with fragments cut away to more fully illustrate its construction.

Figure 4:
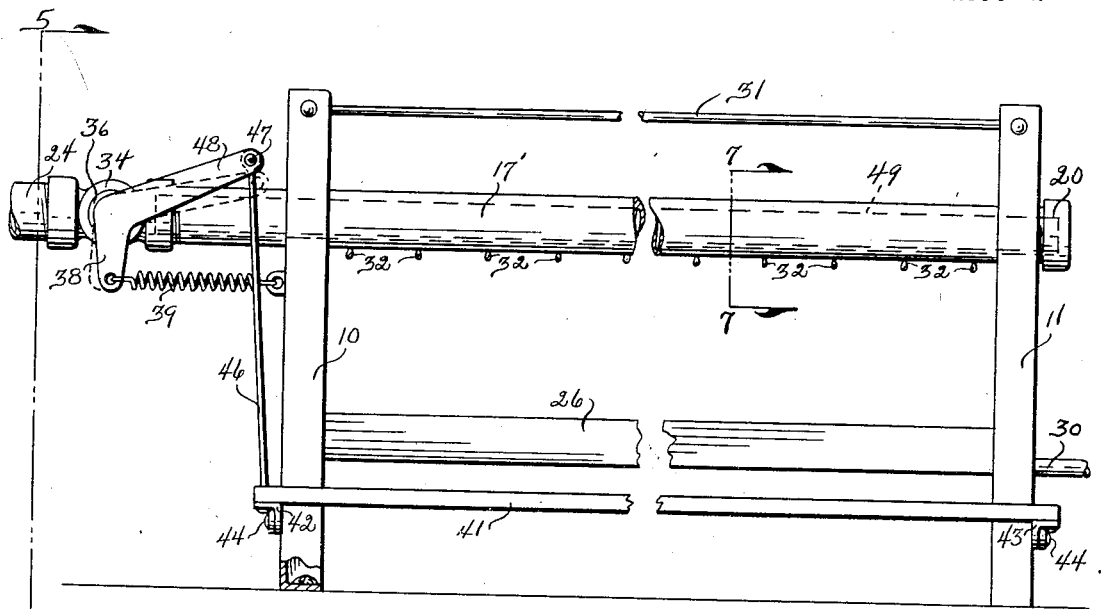
Fig. 4 is a side elevation of a poultry fountain equipped with automatic means for shutting off the water when the fowls are not in position for taking water therefrom, portions being broken away to economize space.

The raising of fowls such as chickens, requires more attention than raising other animals. This is principally due to the easy spreading of disease among chickens because of their usual living conditions, such as the necessity for them to place their soiled beaks into their drinking water in order to drink. By experience, we know that one lone diseased chicken can expose a whole flock to the same disease via the drinking trough. Many chicken raisers clean the watering troughs every two hours and replace with fresh water. This system, however, is far from perfect and requires much time and energy. I have overcome all of these objections, as will be appreciated by those skilled in the art.

I have designated the end supporting members of my device by the numerals 10 and 11, which may or may not be secured by suitable means to the flooring 12. The numeral 13 designates a piece of ordinary galvanized iron pipe designed to pass through the openings 14 and 15 in the members 10 and 11 respectively. In the upper portion of the pipe 13 are a plurality of small holes 16, the purpose of which will hereinafter be understood. Embracing the pipe 13 and of an inside diameter somewhat greater than the outside diameter of the pipe 13 is the tube 17 having both ends flared and preferably made of brass or other suitable material. Threaded onto one end of the pipe 13 is the ordinary manually operated valve 18. Around the pipe 13, extending into one of the flared ends of the tube 17 and adjacent the valve 18 is a gasket 19, as shown in Fig. 3. Threaded onto the other end of the pipe 13 is the end closing cap 20. Tightly embracing the pipe 13, entering the other flared end of the tube 17 and adjacent the cap 20 is the gasket 21, which is a duplicate of the gasket 19. By the above described construction, if the valve 18 and cap 20 are screwed on the pipe 13, the gaskets 19 and 21 will be wedged between the pipe 13 and the tube 17, thereby hermetically sealing the same at both ends. The numeral 22 designates a plurality of small holes formed in the bottom portion of the tube 17. Positioned between the pipe 13 and the tube 17 and over the holes 22 is a fine wire mesh 23 extending the full length between the two gaskets. The numeral 24 designates a pipe leading from the valve 18 to a source of water supply not shown. The numeral 25 designates projections formed on the tube 17 for preventing the same from oscillating. The numeral 26 designates a trough positioned below the tube 17 and having its two ends soldered or otherwise secured to the supporting members 10 and 11, which also form the ends of the trough as shown in Fig. 3. Each of the upper marginal rims of this trough, which is designated by the numeral 27, is formed into a horizontal groove as shown in Fig. 2. Slidably mounted in these two horizontal grooves and completely covering the trough 26, is the comparatively coarse mesh wire 28 having one end extending through an opening 29 in the end member 11. The numeral 30 designates an outlet pipe communicating with the bottom of the trough 26. It should be noted that the sides of the supporting members 10 and 11 slope upwardly and toward a point, in order to make it impossible for poultry using the device to use the end members 10 and 11 as a perch. To prevent them from using the tube 17 as a perch, I have provided the small wire 31 having its two ends secured to the top portions of the members 10 and 11 respectively. This wire 31 is too small to successfully support and balance a fowl itself and is close enough to the tube 17 to prevent its being used as a perch.

The practical operation of my device for supplying drinking water to poultry, is as follows:

The valve 18 is turned to such a position that the water in the pipe 24 is permitted to enter the pipe 13 from which it passes out of the holes 16. After passing out of these holes, it travels around the outside of the pipe 13 to the bottom of the tube 17 where it eventually works its way through the fine mesh wire to the holes 22, where it forms into drops 32. These drops are either taken by the beaks of the drinking poultry or become so heavy that they fall into the trough 26 and pass out through the pipe 30. The rapidity of the forming of these drops is regulated by the valve 18, which should be according to the number of chickens. If after long usage, any of the natural sediment in the water should clog the device, this valve should be completely opened, thereby flushing out all foreign matter. If for any reason this does not successfully eliminate the trouble, it only takes a moment to dissemble the complete device by removing the cap 20. The glistening drops of water readily catch the eyes of the fowls and encourage the drinking of more water, which is essential to a healthy flock. It is not necessary to teach baby chicks to drink from this device, as is the case with the ordinary troughs which often necessitates the placing of the beaks of the baby chickens into the water, to teach them that such a substance is in the trough. The trough 26 of my device should be deep enough to prevent the chickens from attempting to obtain any water from it and the coarse mesh wire 28 prevents them from getting into the trough. If the trough should become soiled after long usage, it can easily be cleaned by removing the wire mesh 28 through the opening 29. By the use of this device the drinking poultry always have absolutely fresh water at all times and it is impossible for them to pollute the water by dirty beaks or the wading in the drinking water with their feet. Once the device is installed, it requires no attention whatsoever, except perhaps, a seasonal cleaning. Another advantage of the device resides in the fact that dripping water is much cooler than when standing in a pan for the chickens to drink from. The fine wire mesh is very essential and should be placed evenly over and on either side of the row of holes 22, so that the water will drip uniformly from all the holes. To prevent it from becoming displaced in the tube 17, it may be soldered or otherwise secured. The device is very economical in manufacture and can be made any size or length to accommodate the size of the flock. The waste water from the pipe 30 may be used for irrigating purposes or the like, but under no circumstances should it be allowed to remain any place where the poultry could use it for drinking purposes.

If it is desired to remove the fountain assembly from the end supporting members 10 and 11, it is merely necessary to rotate the same to a position where the projections 25 will pass through the notch 33 in each of the openings 14 and 15.

Figure 5:
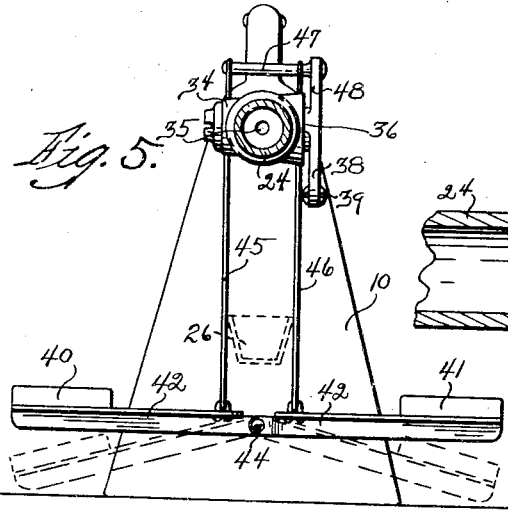
Fig. 5 is a sectional end elevation substantially on the line 5—5 of Fig. 4, dotted lines showing the positions of some of the parts when the fowls are in the act of taking water from the fountain.
Figure 6:
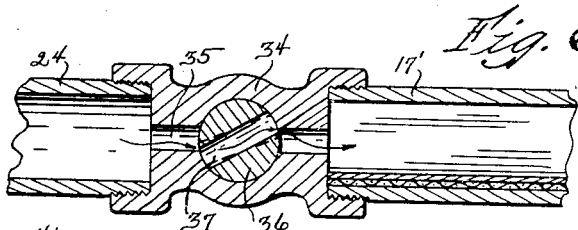
Fig. 6 is an enlarged detail section of the valve employed in this form of the device.

In the construction according to Figs. 4, 5, and 6, a special automatic valve is positioned between the supply pipe 24 and the tube which is here designated by the numeral 17' and which is supported by the end members 10 and 11 as previously described. The special automatic valve comprises a body 34 having a passage 35 extending longitudinally therethrough and forming a communication between the supply pipe 24 and the fountain proper, in this instance being connected at one end to the tube 17'. The valve body 34 is formed with a transverse cylindrical recess in which a valve plug 36 is rotatably mounted, said plug being formed with a port 37 adapted to register to greater or less extent with the adjacent portions of the passage 35, as indicated in Fig. 6. The valve plug 36 projects from the body 34 and is formed with an arm 38 to which a retractile coil spring 39 is fixed, the opposite end of said spring being secured to any suitable fixed member such as the adjacent end support 10.

Perch bars 40 and 41 are mounted longitudinally of and on opposite sides of the fountain at suitable elevations. Each perch bar 40 and 41 is mounted on a pair of levers 42 and 43, the levers extending inwardly of the device and being pivoted at their inner ends on the end supports 10 and 11 respectively by means of bolts or the like 44. Links 45 and 46 are pivotally connected at their lower ends to the levers 42 of the respective perch bars 40 and 41 and said links extend upwardly and have a pivotal connection to a rod or the like 47 carried by the free end of an arm 48 rigidly attached to or formed on the valve plug 36.

The spring 39 normally acts to hold the valve plug 36 in such position that the valve is closed or practically closed, thus shutting off the main supply of water to the fountain. I believe, however, that it is desirable to so arrange the parts that the valve is at all times in slightly open position, so that drops of water may form at the openings 22 as previously described, thus attracting the attention of the fowls and tending to cause them to take water from the device. When a fowl desires to drink, or is attracted by the slowly forming and glistening drops on the tube 17', it takes a postion upon one of the perch bars 40 or 41, thus causing said perch bar to move downwardly slightly as indicated by dotted lines in Fig. 5. This causes a pull upon the link 45 or 46 and a downward movement of the arm 48, and an opening movement of the valve plug 36, whereby an increased amount of water is permitted to enter the fountain.

The rod 47 in its normal position preferably extends transversely a slight distance above the tube 17' and its downward movement is limited by contact with said tube as indicated by dotted lines in Fig. 4.

The automatic arrangement here shown and described is an optional attachment or addition to my sanitary poultry fountain and when employed, it serves to economize in the matter of the water supply by automatically shutting off or practically shutting off the same at night or at other times when not in use by any of the flock which it serves, and yet insures that a supply of water is always ready for any member of the flock whenever it wishes to drink or whenever it is attracted by the beads of water.

Figure 7:
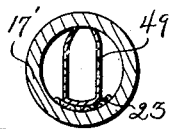
Fig. 7 is a cross-section on the line 7—7 of Fig. 4, showing a modified form of the water pipe and elements associated therewith.
Figure 8:
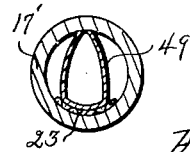
Fig. 8 is a similar view showing a slightly different form of the device.
Figure 9:
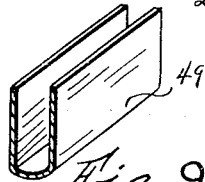
Fig. 9 is a sectional view of a short length of the water tube employed in the construction shown in Figs. 7 and 8.

In Figs. 7, 8, and 9, I have shown a substitute construction for the water pipe previously described. According to this modified form, I employ a strip of sheet metal such as sheet brass or galvanized iron, bent into substantially channel shape as indicated in Fig. 9, wherein it is designated by the numeral 49. The channel strip 49 is of a length corresponding substantially with that of the tube 17' and is adapted to be inserted therein by lengthwise movement and with greater or less force. The bottom of the channel strip 49 preferably is rounded and is adapted to contact with the strip of wire mesh 23 which is mounted in the bottom of the tube 17' as previously described. The side margins of the channel strip 49 are arranged to contact with the upper inner portion of the wall of the tube 17' and said margins preferably converge toward each other. The channel strip 49 is of such nature that it has an inherent resilience and when forced into the tube 17' it exerts a pressure against the wire mesh 23, thus holding said member firmly over the holes 22 in the tube 17'. The channel strip 49 may be bent to the form shown in Fig. 7, wherein the upper portions only are arranged to converge toward each other; or it may assume the form shown in Fig. 8, wherein the entire side walls of the channel strip are curved toward each other, even to the extent that the upper margins are in contact with each other. It will be obvious that the strip 49 may be shaped and arranged to exert greater or less pressure upon the wire mesh 23 as desired.

Some changes may be made in the construction and arrangement of my improved poultry drinking fountain without departing from the real spirit and purpose of my invention and it is my intention to cover by my claims any modified forms of structure or use of mechanical equivalents which may be reasonably included within their scope.

I claim:

1. A sanitary poultry fountain comprising a support, a tube mounted in said support, said tube being closed at one end and having its opposite end communicating with a source of water supply, said tube being formed with a series of spaced apertures for the escape of water in drops, a strip of mesh wire in said tube overlying said apertures, and a tubular member extending lengthwise within said tube in contact with said strip of wire mesh, said tubular member being formed with restricted means for the escape of water to the interior of said tube.

2. A sanitary poultry fountain comprising a support, a tube mounted in said support, said tube being closed at one end and having its opposite end communicating with a source of water supply, said tube being formed with a series of spaced apertures for the escape of water in drops, a strip of mesh wire in said tube overlying said apertures, a tubular member extending lengthwise within said tube in contact with said strip of wire mesh, said tubular member being formed with restricted means for the escape of water to the interior of said tube, a valve for controlling the supply of water to said tubular member, spring means for normally holding said valve in substantially closed position, a perch bar arranged longitudinally of and below said tube and pivotally mounted for a limited vertical movement, and a link pivotally connecting said perch bar to said valve for moving the valve to opened position when weight is applied to said perch bar.

3. A sanitary poultry fountain comprising a support, a tube mounted in said support, said tube being closed at one end and having its opposite end communicating with a source of water supply, said tube being formed with a series of spaced apertures for the escape of water in drops, a strip of mesh wire in said tube overlying said apertures, a tubular member extending lengthwise within said tube in contact with said strip of wire mesh, said tubular member being formed of a strip of resilient sheet metal bent to channel form and inserted in said tube under pressure to cause a forcible contact against said strip of wire mesh.

4. A sanitary poultry fountain, comprising a support, a tube closed at one end and at the other end connected with a source of water supply, said tube being formed with a series of normally open holes in its wall, and means within and extending longitudinally of said tube to contact with the inner ends of said holes to automatically restrict the flow of water from said holes and to cause the water to form in drops on the exterior of the tube, for attracting the attention of fowls and causing them to drink the water by picking off the drops so formed at the exterior of the tube.

5. A sanitary poultry fountain, comprising a support, a tube closed at one end and at the other end connected with a source of water supply, said tube being formed with a series of normally open holes in its wall, and means in said tube to restrict the flow of water from said holes and to cause the water to form in drops on the exterior of the tube, for attracting the attention of fowls and causing them to drink the water by picking off the drops so formed at the exterior of the tube.

6. A sanitary poultry fountain, comprising a support, a tube closed at one end and at the other end connected with a source of water supply, said tube being formed with a series of normally open holes in its wall, and a reticulated member in said tube overlying said holes to restrict the flow of water therefrom and to cause the water to form in drops on the exterior of the tube for attracting the attention of fowls and causing them to drink the water by picking off the drops so formed at the exterior of the tube.

7. A sanitary poultry fountain, comprising a support, a tube closed at one end and at the other end connected with a source of water supply, said tube being formed with a series of normally open holes in its wall, and a reticulated member in said tube overlying said holes to restrict the flow of water therefrom and to cause the water to form in drops on the exterior of the tube for attracting the attention of fowls and causing them to drink the water by picking off the drops so formed at the exterior of the tube, together with means in said tube for exerting pressure on said reticulated member to press it closely against said holes.

8. A sanitary poultry fountain, comprising a support, a tube closed at one end and at the other end connected with a source of water supply, said tube being formed with a series of normally open holes in its wall, means in said tube to restrict the flow of water from said holes and to cause the water to form in drops on the exterior of the tube, for attracting the attention of fowls and causing them to drink the water by picking off the drops so formed at the exterior of the tube, and a trough below said tube for receiving excess water escaping from its drip openings.

9. In a sanitary poultry fountain, two tubular members mounted one within the other, means for admitting water to said tubular members, the outermost member being formed with a series of small holes, and a reticulated member mounted between said tubular members and covering said holes to restrict the escape of water therefrom to cause the water to drop slowly from the exterior of the outer member, whereby the attention of fowls is attracted and they are caused to pick off the drops so forming at the exterior of the tubular member.

10. In a sanitary poultry fountain, two tubular members mounted one within the other, means for admitting water to said tubular members, the outermost members being formed with a series of small holes, a reticulated member mounted between said tubular members and covering said holes to restrict the escape of water therefrom to cause the water to drop slowly from the exterior of the outer member, whereby the attention of fowls is attracted and they are caused to pick off the drops so forming at the exterior of the tubular member, a valve for controlling the supply of water to said tubular member, spring means for normally holding said valve in substantially closed position, a perch bar arranged longitudinally of and below said tube and pivotally mounted for a limited vertical movement, and a link pivotally connecting said perch bar to said valve for moving the valve to opened position when weight is applied to said perch bar.

JOHN LOUCIEN CHESNUTT.